United States Patent [19]

Husher et al.

[11] 4,176,062
[45] Nov. 27, 1979

[54] PROCESS FOR THE SEPARATION OF FOAM FROM EFFLUENTS OF COKE OVEN PLANTS

[75] Inventors: Lee K. Husher, Bethel Park, Pa.; Heinrich Weber; Kurt Tippmer, both of Recklinghausen, Fed. Rep. of Germany

[73] Assignee: United States Steel Corporation, Pittsburgh, Pa.

[21] Appl. No.: 756,700

[22] Filed: Jan. 4, 1977

Related U.S. Application Data

[63] Continuation of Ser. No. 656,211, Feb. 9, 1976, abandoned.

[51] Int. Cl.² .................... B01D 35/18; C10C 1/03; C10C 3/18
[52] U.S. Cl. ........................ 210/72; 208/39; 210/73 W; 210/83; 210/187; 210/195.3; 210/526

[58] Field of Search ............ 210/73 W, 83, 187, 23 R, 210/DIG. 5, 525, 526, 72, 195 S; 208/39, 186, 187, 254; 201/3

[56] References Cited

U.S. PATENT DOCUMENTS

| | | | |
|---|---|---|---|
| 2,236,895 | 4/1941 | Court | 210/525 X |
| 2,334,703 | 11/1943 | Henkel | 210/526 X |
| 2,601,904 | 7/1952 | Erwin | 210/187 X |
| 2,766,203 | 10/1956 | Brown et al. | 210/73 W X |
| 2,813,074 | 11/1957 | Banks | 210/525 X |
| 3,121,680 | 2/1964 | Uabattari | 210/525 X |
| 3,135,681 | 6/1964 | Pflastfrer | 208/39 |
| 3,707,464 | 12/1972 | Burns | 210/730 W X |
| 3,923,659 | 12/1975 | Ullrich | 210/187 X |

Primary Examiner—Frank A. Spear, Jr.
Attorney, Agent, or Firm—William L. Krayer

[57] ABSTRACT

Tar and coal fines are separated from ammonia liquor in a coke making operation by a series of settling steps including one in which a foam is physically removed from the surface area of a decanter and placed in a separate decanter.

2 Claims, 2 Drawing Figures

PROCESS FOR THE SEPARATION OF FOAM FROM EFFLUENTS OF COKE OVEN PLANTS

This is a continuation of application Ser. No. 656,211, filed Feb. 9, 1976, now abandoned.

BACKGROUND OF THE INVENTION

The invention concerns a process and equipment for the separation of the tar and ammonia liquor mixture from coke oven plants. The coarse components are conventionally separated in a primary separator or decanter and, by utilizing heat, such as heat of the separated ammonia liquor, continuously divided into tar and ammonia liquor.

Devices and equipment for separating tar from ammonia liquor are known, for instance, in German Patentschrifts Nos. 917,388 and 935,020 as well as Auslegeschrift No. 1,057,721. The tar collecting tank of the tar separator has a lower tapered portion, and is enclosed by the ammonia liquor storage tank. The tar discharge pipe can be installed deep in the inner part of the tar collecting tank.

Other separating devices for tar and ammonia liquor are designed according to similar principles, for instance the equipment according to German Auslegeschrift No. 1,044,342 and Patentschrift No. 1,156,823, of which the latter is said to operate without prior separation of the heavy tar.

If necessary, and for special requirements regarding the purity of the tar, such as solids and water content two tar separators can be connected in series as shown in German Offenlegungschrift No. 2,257,428. Also, temperatures above 100° C. and increased pressures have been applied for the separation (German Patentschrift No. 1,020,349).

These known devices are provided for coke oven plants in which a coal with a water content of 5-10% is charged into the ovens. Where this type of coal is not finely ground, the separation into a tar and liquor phase with known technology is adequate.

The gas which is emitted during the manufacture of coke contains typically about 30% of the weight of the coal in the form of organic "volatiles" as well as considerable moisture. This gas is usually sprayed with water or with recycled "flushing liquor" to remove entrained solids, generally in the form of tar. The collecting main for the gas passes the whole length of the battery, each lead-in having a spray and additional sprays being spaced about every third oven. A suction main tied in to the collecting main will ordinarily contain about 25% by volume of a mixture of tar and "liquor". The liquor containing the tar is taken to a decanter, where it is allowed to separate into tar on the bottom and an aqueous ammonia liquor which may be decanted off. A portion of the aqueous liquor may be recycled for use in the sprays as described above.

The reader may also be interested in reviewing U.S. Pat. Nos. 2,018,377, 2,697,067, 2,775,541, 2,799,678, and 2,937,130.

Recently the art has begun to use very finely ground and pre-dried coals or preheated coals, having very low moisture contents in order to obtain faster coking rates and to increase the throughput capacity of the oven battery. It has been found that the known systems and processes for the separation of the tar and ammonia liquor mixture are not sufficient for use with finely ground, preheated systems, because the clean separation necessary for a trouble-free operation could not be attained. Generally using prior art systems, the moisture content of the tar is too high so that it can frequently be useless. Also, the tar content of the liquor phase cannot be tolerated because when returning the ammonia liquor to the collection main of the battery, the spraying nozzle becomes fouled and the surplus liquor deposits its tar content in the treatment plants.

The condensates in the tar and ammonia liquor produced when charging finely ground pre-dried or preheated coal into the oven chambers tends to form suspensions and foam which cannot be separated properly in known devices and according to known processes, because they have a persistent stability which is detrimental to the operation. This tendency to form suspensions and foam is favored by the presence of finely dispersed solids, particularly coal particles which are coated with tar and which float in the ammonia liquor and form, with the addition of air and other gases, a floating disperse system, or foam. Surfactants appear to be formed, especially in the presence of ammonium and chloride ions, which can promote the formation of suspensions and foam.

A further separation of foam and suspension has been used by the liquid streams leaving the tar separators sometimes under pressure, heated and/or with the addition of the salts of multi-valued acids which have a separating effect on colloidal systems. In such cases additional expenditures for apparatus and considerable additional expenses for energy and chemicals are necessary.

SUMMARY OF THE INVENTION

An object of this invention is to provide a process for the separation of suspensions and foam from the tar, ammonia liquor and condensate mixture obtained when coking finely ground pre-dried or preheated coal without considerable additional expenditures and consumption of energy and chemicals, and to obtain a tar phase and a liquid phase, so that the liquid phase can be recycled to the collection main and can be used, problem-free for the cooling of the hot gases produced when coking the coal, while the surplus liquor can be further processed. The suspension may contain finely divided coal as well as tar, and frequently is entrained in the foam.

The problem of suspension and foam has been solved by removing the suspension and floating foam from the surface of the ammonia liquor in the primary decanter and delivering them to a foam separator vessel. Thereafter the ammonia liquor phase in the foam separator is returned to the primary decanters.

The most favorable temperature range for this final separation in between 70° and 90° C. The foam and/or suspension has become known as "swimming tar"; however, as may be seen from the following analyses, "swimming tar" actually includes substantial amounts of fine coal or partially devolatilized coal.

Table I

| Analysis of Swimming Tar Sample | |
|---|---|
| Original Sample | |
| % Moisture | 48.4 |
| % Tar | 19.1* |
| % Coal or solids | 32.5* |
| Water or Liquor Phase | |
| pH | 8.57 |
| % Chlorides | 2.86 |

Table I-continued

| Analysis of Swimming Tar Sample | |
|---|---|
| Tar-Coal Phase | |
| Wt. % Moisture | 40.4 |
| Wt. % Quinoline insolubles (dry) | 65.02 |
| Wt. % Volatile matter (dry) | 37.50 |
| Wt. % Ash (dry) | 6.19 |
| Wt. % Carbon (dry) | 81.39 |
| Wt. % Hydrogen (dry) | 4.43 |
| Wt. % Sulfur (dry) | 1.07 |

*Calculated from Q.I. content

The tar-coal phase was further treated to remove the quinoline soluble tar in order to analyze the coal and other solids.

| Sieve analysis | (cumulative percent) |
|---|---|
| % + 20 mesh | 1.2 |
| % + 50 mesh | 7.0 |
| % + 70 mesh | 9.3 |
| % + 100 mesh | 12.8 |
| % + 200 mesh | 26.7 |
| % minus 200 mesh | 73.3 |
| Wt. % V.M. (dry) | 21.90 |
| Wt. % Ash (dry) | 8.42 |
| Wt. % Carbon (dry) | 78.83 |
| Wt. % Hydrogen (dry) | 4.22 |
| Wt. % Sulfur (dry) | 1.05 |

According to the invention, it is possible to separate, in the final stage, the tar and ammonia liquor mixture without considerable atitional consumption of energy and chemicals so that a trouble-free operation is possible and no fouling in the downstream plant units will be encountered.

It is understood that the surfaces or interfaces should be disturbed as little as possible, i.e. every unnecessary movement should be avoided when removing the suspensions and foams and when returning the ammonia liquor.

The primary separators from which suspension and foam are removed are expediently provided with an adjustable overflow at their rear wall over which the suspension and foam can flow. They are then delivered through a downcomer to the final separator. In this way the liquid phase in the heavy tar tank are only slightly disturbed.

The additional equipment (such as a rake and associated equipment in the pre-decanter) can be designed according to the new process, with relatively small dimensions and sizes of the apparatus. The condensate streams from the primary decanters containing ammonia liquor and tar may be sent to either or both of the primary separator and/or the final separator. Normally the separated tar phase from the primary separator is delivered to the final separator from which the pure tar can be handled. Also the ammonia water separated from the water storage tank of the primary tar separator is led into the water storage tank of the final tar separator before it is further processed. This means two tar separators normally are connected in series both for the water and the tar flow.

In the final tar separator it is possible to separate the tar from 2 to 3% of water having a very low content of suspended solids.

Preference is given to the process with two primary decanters connected in parallel and two tar separators connected in series regarding the flow of tar and water.

Tar separators, primary decanters and foam separators may be equipped with conventional controls and devices which will facilitate the adjusting and variation of the liquid levels.

BRIEF DESCRIPTION OF DRAWINGS

Our invention is illustrated in the accompanying drawings, in which.

DESCRIPTION OF SPECIFIC EMBODIMENTS

Figure 1:
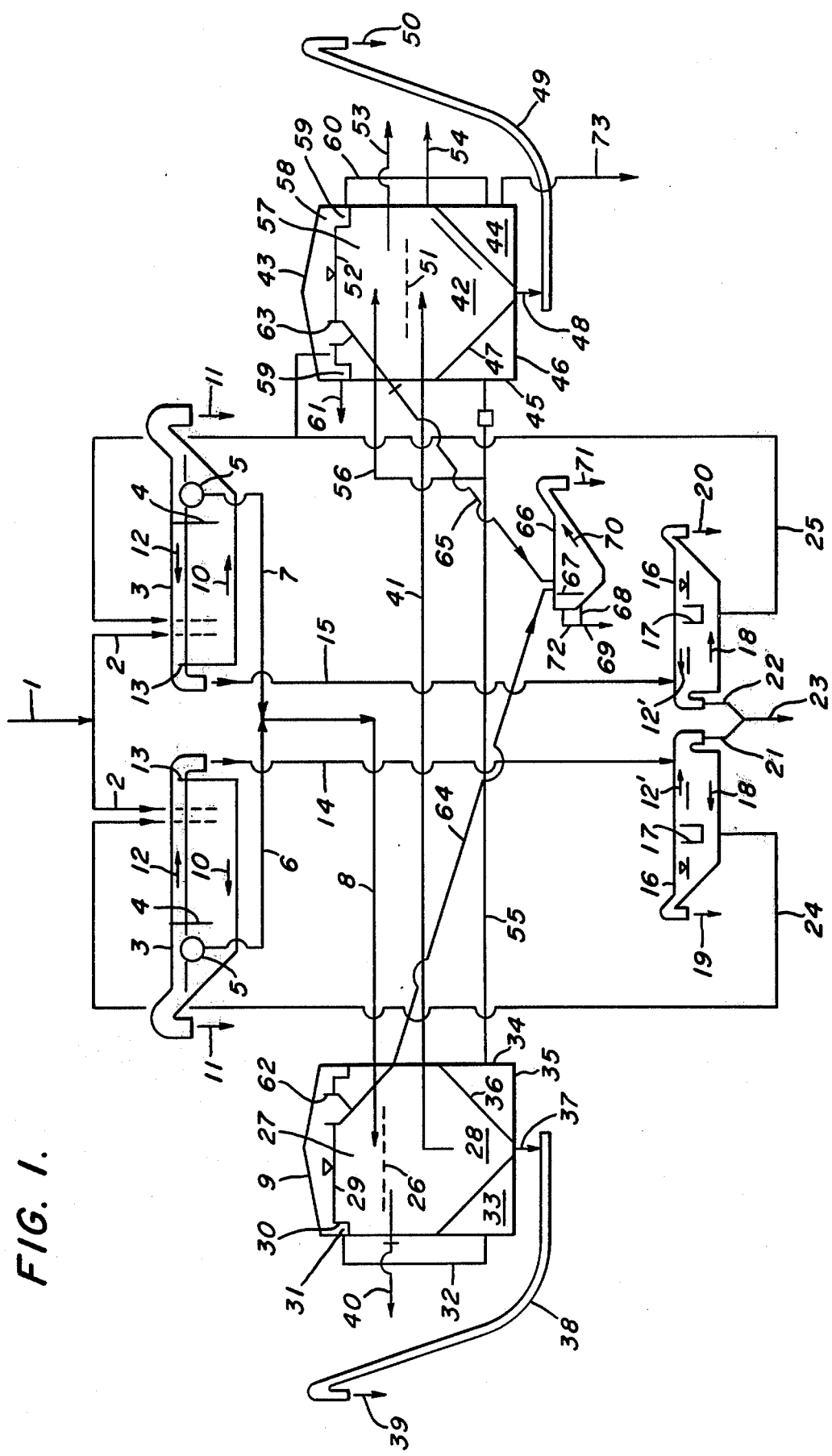
FIG. 1 is a more or less diagrammatic depiction of a preferred flushing liquor treatment system and FIG. 2 is a perspective view of our preferred scraping apparatus installed in the primary decanter(s) (pre-decanter) and the foam separator(s).

The mixture consisting of tar, ammonia liquor and condensate is delivered through pipeline 1 and distributed to the two branches of the immersion line 2 through which it is passed into the two primary decanters 3 where the first separation of the pitch-sands takes place. The term "pitch-sands" means an inhomogeneous agglomerate of tar with fine solid particles (coal) and water. The mixture passes under the partition walls 4 and flows towards the rotating screen drums 5. Aqueous condensate and tar leave through the holes in the drum and flow through pipelines 6, 7 and 8 to the first tar separator 9. The pitch-sands in the tar and water phase will impinge on the surface of screening drums 5 and is removed from the screening drums 5 by scrapers (not shown) and sinks to the bottom of the primary decanters 3, from where it is dredged by devices 10 designed as scraper conveyors. The scraper conveyors deliver the pitch-sands to the discharge openings 11. Suspension and foam are collected on the surface in front of the partition walls 4, removed by the traveling skimmer plates 12, and pulled over weirs 13 into lines 14 and 15 through which they are delivered into the foam separators 16. The foam separators are equipped with separating devices designed as water discharge chambers 17 which are provided with weirs adjustable in height (not shown). The pitch-sands sink and are taken up by the bottom scraping device 18 and delivered to the discharge openings 19 and 20. Any floating suspension and/or foam will be delivered to the discharge openings 21 and 22 by traveling skimmer plates 12 and disposed of through pipeline 23. The separated water will be drawn from the chambers 17 through lines 24 and 25 and returned to the primary decanters 3.

The water and tar mixture from line 8 is delivered into the primary separator 9 in which the interface of tar and water is shown by 26. The separated water of the surface being shown by 29 flows over the weir 30 into the channel 31 and through line 32 into the jacket chamber 33 which is enclosed by the cylindrical wall 34, having a bottom 35 and the tapered part 36. The tapered part 36 of the tar collection chamber 28 drains into the tar outlet 37 which extends outwards through the bottom 35 of the jacket chamber 33. The pitch-sands collected in the tapered part are discharged by the scraper conveyor 38 and disposed of through the outlet 39. As an additional precaution the tar separator 9 is equipped with a discharge line 40 for removal of suspensions above the interface 26. The tar from the collection chamber 28 is delivered through line 41 to the tar collection chamber 42 of the second tar separator 43 which is identical to the primary tar separator 9. It is equipped with the jacket chamber 44, which is enclosed by the cylindrical wall 45, the bottom 46 and the tapered wall 47. Final separation is made in the tar collection chamber 42 and the pitch-sand sinking down is discharged through tar outlet 48 by means of scraper conveyor 49 and disposed of through the outlet 50.

The interface of tar and water is indicated by 51 and the water surface by 52. As an additional precaution, the final tar separator 43 is equipped with a discharge line 53 for emulsions removal above the interface 51. The tar with a water content of 2-3% is delivered through line 54 to various points of use. The water collected in the jacket chamber 33 of the tar separator 9 is delivered into the jacket chamber 44 of final separator 43 through line 55. A butterfly valve is provided in the line 55 for controlling a branch stream which is delivered through line 56 into the tar and water separation chamber 57 and permits better separation and equilibrium of the two separators. Separated water flows over the weir 58 into the channel 59 and through line 60 into the jacket chamber 44. The water is finally discharged through lines 73 or 34 and returned to the collecting mains of the battery. It no longer contains coal particles or other suspended solids which could plug the liquor nozzles in the collecting mains.

The water distilled during the coking process entering the tar separation plant leaves the final tar separator 43 as condensate via the channel 59 and the condensate discharge 61 and is used in other processes.

In order to provide for an additional means of collecting small amounts of suspension and foam from the water surfaces 29 and 52 of the two tar separators 9 and 43, the tar separators are equipped with adjustable weirs 62 and 63. Lines 64 and 65 are connected to an auxiliary foam separator 66 in which a partition wall 67 is provided. The water separated from suspension and foam after a certain residence time, passes under the partition wall 67 and leaves through the outlet nozzle 68 and line 69 to enter into a collecting tank. When it is sufficiently settled, it is pumped to the primary decanters 3. Pitch-sands sink to the bottom and are removed up by a scraper conveyor device 70 and disposed of through outlet 71. An outlet nozzle 72 is provided as a safety overflow.

Figure 2:
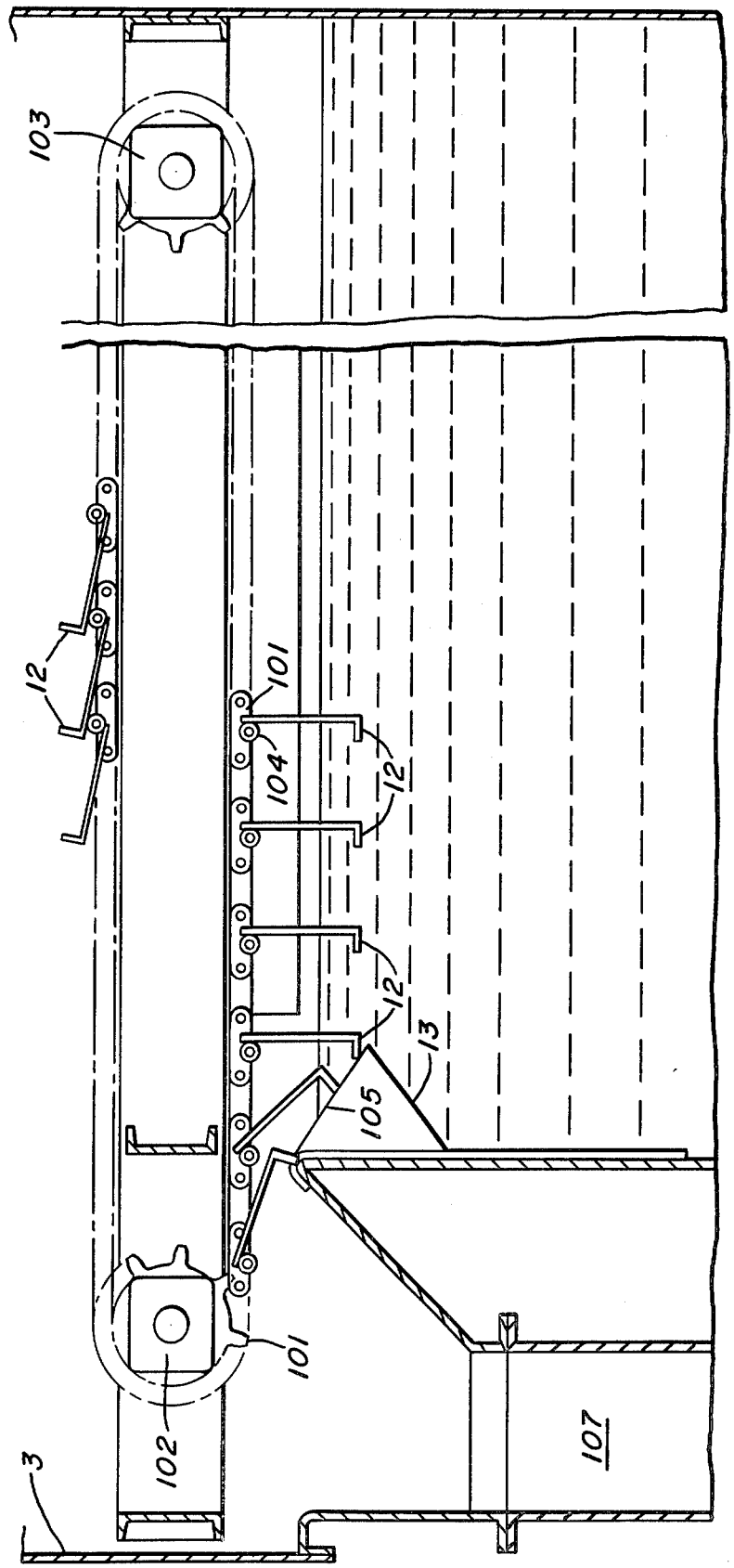

Referring to FIG. 2, a preferred configuration of traveling skimmer plates 12 is shown. A foam scraper conveyor 101 is mounted in primary decanter 3 and the foam separators 16 and 66 on rolls 102 and 103 with drive means not shown. On the conveyor 101 is a series of skimmer plates 12 having an L-shape generally as shown and pivotally attached at 104 so that when moving suspension and foam to the left on the figure they remain generally vertical. Upon striking the angled surface 105 of weir 13, the suspension and foam proceeds by gravity down chute 107 to foam separator 16. The skimmer plates 12 are then returned on the upper side of conveyor 101 for reuse.

We claim:

1. In a process for the separation of the mixture of tar and ammonia liquor produced in the manufacture of coke from finely divided coal, wherein a mixture consisting of tar, ammonia liquor and condensate is freed from coarse particles in a primary decanter with concomitant development of a surface suspension and foam of "swimming tar", the improvement wherein the suspension and foam floating on the surface of the ammonia liquor in the primary decanter is removed by traveling mechanical skimmers, delivered to a foam separator, and permitted to reside in the foam separator for at least two hours to effect separation of a water phase, removing the water phase from the foam separator, and recycling it to the primary decanter.

2. Process of claim 1 in which heat is supplied to the primary decanter to effect a secondary separation of tar from ammonia liquor.

* * * * *

UNITED STATES PATENT AND TRADEMARK OFFICE
CERTIFICATE OF CORRECTION

PATENT NO. : 4,176,062
DATED : November 27, 1979
INVENTOR(S) : Lee K. Husher, Heinrich Weber, and Kurt Tippmer It is certified that error appears in the above–identified patent and that said Letters Patent are hereby corrected as shown below:

Column 1, line 6, change "abondoned" to -- abandoned --.

Column 2, line 55, change "in" to -- is --.

Column 3, line 34, change "attitional" to -- additional --.

Signed and Sealed this

First Day of July 1980

[SEAL]

Attest:

SIDNEY A. DIAMOND

Attesting Officer     Commissioner of Patents and Trademarks